US012350588B2

(12) United States Patent
Damian et al.

(10) Patent No.: US 12,350,588 B2
(45) Date of Patent: Jul. 8, 2025

(54) VIDEO GAME OVERLAY

(71) Applicant: GOOGLE LLC, Mountain View, CA (US)

(72) Inventors: Alexandru-Marian Damian, Zürich (CH); Victor Carbune, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 208 days.

(21) Appl. No.: 17/766,146

(22) PCT Filed: Oct. 4, 2019

(86) PCT No.: PCT/US2019/054899
§ 371 (c)(1),
(2) Date: Apr. 1, 2022

(87) PCT Pub. No.: WO2021/066849
PCT Pub. Date: Apr. 8, 2021

(65) Prior Publication Data
US 2022/0339542 A1 Oct. 27, 2022

(51) Int. Cl.
*A63F 13/497* (2014.01)
*A63F 13/537* (2014.01)
*A63F 13/5375* (2014.01)
*G06T 11/00* (2006.01)
*G06V 20/40* (2022.01)

(52) U.S. Cl.
CPC .......... *A63F 13/537* (2014.09); *A63F 13/497* (2014.09); *A63F 13/5375* (2014.09); *G06T 11/00* (2013.01); *G06V 20/41* (2022.01); *G06V 20/49* (2022.01); *G06T 2210/62* (2013.01); *G06V 2201/10* (2022.01)

(58) Field of Classification Search
None
See application file for complete search history.

(56) References Cited

U.S. PATENT DOCUMENTS 6,582,230 B1 6/2003 Aoshima et al.
2007/0060359 A1* 3/2007 Smith ............... A63F 13/00
463/42

(Continued)

FOREIGN PATENT DOCUMENTS

JP 2000262738 A 9/2000
JP 2005058383 A 3/2005

(Continued)

OTHER PUBLICATIONS

Communication pursuant to Article 94(3) EPC mailed Feb. 3, 2023 for EP Application No. 19790412.1, 5 pages.

(Continued)

*Primary Examiner* — Damon J Pierce

(57) ABSTRACT

The disclosed subject matter can receive a source video and identifies one or more player actions based on the source video. A second video can be received that is based on a currently executing game environment. A portion of the source video that exhibits a first gameplay situation that is similar to a gameplay situation in the second video can be determined. A property of the determined portion of the source video can be adjusted to produce a guide video. The guide video can be overlaid on the currently executing game environment.

28 Claims, 8 Drawing Sheets

(56) References Cited

U.S. PATENT DOCUMENTS

| | | | |
|---|---|---|---|
| 2009/0118015 A1 | 5/2009 | Chang et al. | |
| 2010/0035689 A1 | 2/2010 | Altshuler et al. | |
| 2016/0182956 A1 | 6/2016 | Kim et al. | |
| 2017/0087460 A1 | 3/2017 | Perry | |
| 2021/0275922 A1* | 9/2021 | Starich | A63F 13/335 |
| 2021/0316214 A1 | 10/2021 | Perry et al. | |

FOREIGN PATENT DOCUMENTS

| | | |
|---|---|---|
| JP | 5193242 B2 | 5/2013 |
| JP | 5688052 B2 | 3/2015 |
| WO | 2017004433 A1 | 1/2017 |
| WO | 2019135821 A1 | 7/2019 |
| WO | 2019182680 A1 | 9/2019 |

OTHER PUBLICATIONS

International Search Report and Written Opinion mailed Jun. 29, 2020 for corresponding International Application No. PCT/US2019/054899, 13 pages.
Translation of Japanese Notice of Grounds of Rejection mailed May 30, 2023 for JP Application No. 2022-520480, 8 pages.
Communication pursuant to Article 94(3) EPC mailed Aug. 28, 2023 for EP Application No. 19790412.1, 5 pages.
Translation of Japanese Notice of Grounds of Rejection mailed Nov. 28, 2023 for JP Application No. 2022-520480 7 pages.
Translation of Korean Office Action mailed Apr. 4, 2024 for KR Application No. 10-2022-7010941 32 pages.
Communication under Rule 71(3) EPC mailed Mar. 13, 2024 for EP Application No. 19790412.1 38 pages.
Translation of Allowance of Patent mailed Sep. 27, 2024 for KR Application No. 10-2022-7010941, 3 pages.

* cited by examiner

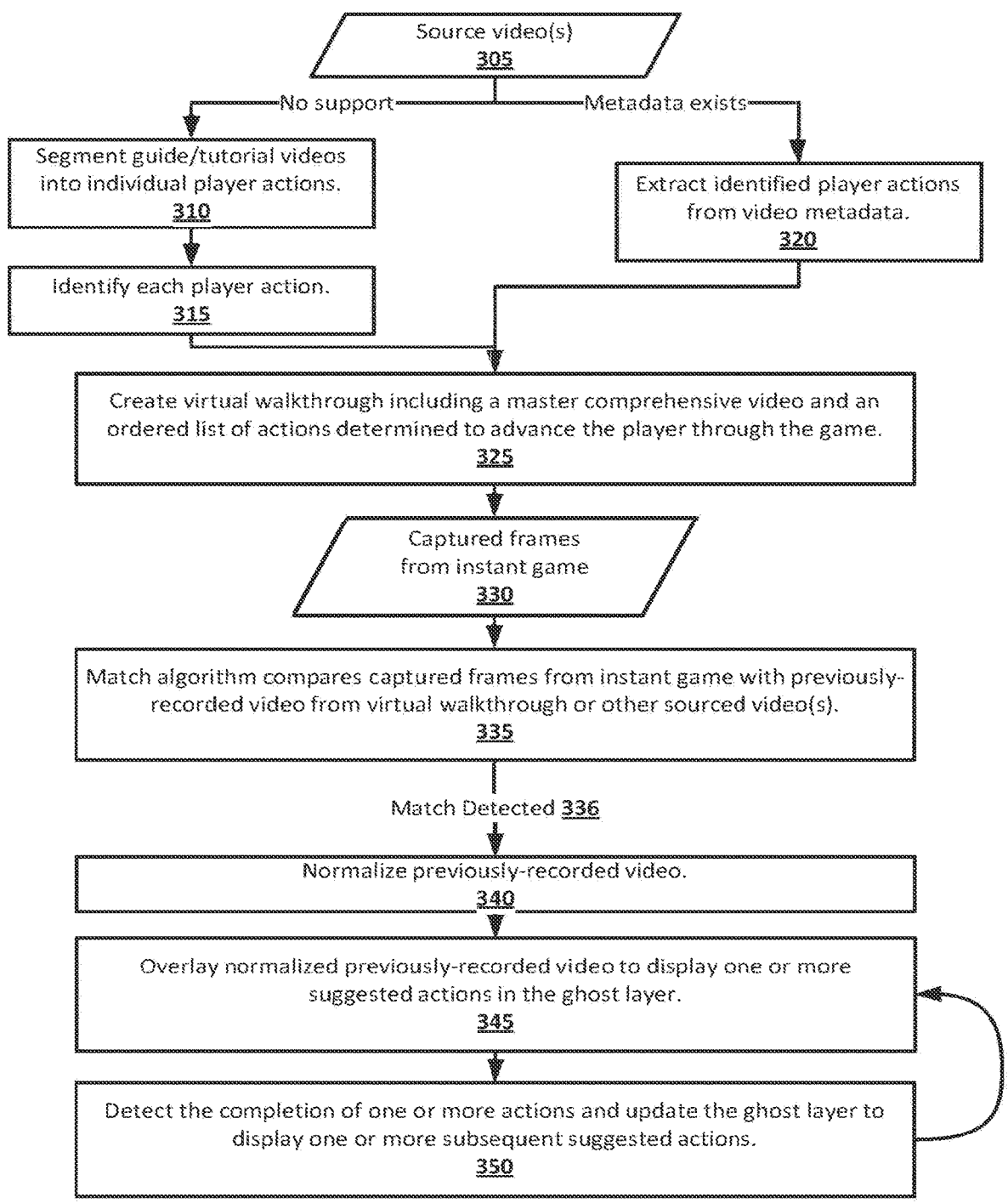

FIG. 4  400

Virtual Walkthrough 405

Game ID: 8675309 470

480

| Beginning | | |
|---|---|---|
| Video Segment 1 410 | | |
| Action 1 411 | Action 2 412 | Action 3 413 |
| ID: 000001 414 | ID: 000002 415 | ID: 000003 416 |
| Description: Move Right 417 | Description: Move Down 418 | Description: Jump 419 |
| Duration: 4.0 seconds 420 | Duration: 1.0 seconds 421 | Duration: 0.5 seconds 422 |

| Video Segment 2 430 | | Video Segment 3 440 |
|---|---|---|
| Action 1 431 | Action 2 432 | Action 1 433 |

| Video Segment 4 450 | | |
|---|---|---|
| Action 1 451 | Action 2 452 | Action 3 453 |

. . .

| Video Segment n 460 | | | | End |
|---|---|---|---|---|
| Action 1 454 | Action 2 455 | Action 3 456 | Action 4 457 | |

VIDEO GAME OVERLAY

CROSS-REFERENCE TO RELATED APPLICATIONS

The present application is a U.S. National Stage under 35 U.S.C. § 371 of International Patent Application Serial No. PCT/US2019/054899, entitled "VIDEO GAME OVERLAY" and filed on 4 Oct. 2019, the entirety of which are incorporated by reference herein.

BACKGROUND

A user may find some portions of a video game more challenging than others. Where the user ceases to make progress in a video game, he or she may resort to watching a gameplay tutorial provided by a video service or website. By watching the video, the user hopes to gain knowledge that will help him or her to advance past a difficult portion of the game. When two display devices are not available, the user may exit the game to launch the video on the same display and restart the game after watching the video. Because this process may be repeated several times until the user advances, the user may find the gaming experience to be less enjoyable.

The user may attempt to find a tutorial or gameplay video that matches the game scenario he or she is faced with. Even where the user succeeds in finding a relevant video, the video may be from an inconvenient perspective, may demonstrate the gaming techniques too quickly, or may be incomplete. The user may also wish to pause, rewind, and playback the video several times, which may or may not be convenient, depending on the display device that the user is using.

BRIEF SUMMARY

According to an embodiment of the disclosed subject matter, a computer-method may include receiving a source video and identifying a plurality of player actions that occur in gameplay captured in the source video. The method may further include receiving a second video. The second video may be based on a currently executing, game environment. The method may further include determining a portion of the source video exhibits a first gameplay situation that may be similar to a gameplay situation in the second video. The method may further include adjusting a property of the determined portion of the source video to produce a guide video. The method may further include overlaying the guide video on the currently executing game environment. The method may further include detecting a completed player action in the currently executing game environment and overlaying an updated guide video based on the detecting. The method may further include segmenting the source video portion into a plurality of player actions. The method may further include extracting a list of player actions from metadata embedded within the source video. The metadata may further include one or more metrics reflecting a skill level of a player. The method may further include selecting the source video based on the one or more metrics. Each identified player action may share a one-to-one correspondence with a game controller input received from a user. The method may further include compiling a virtual walkthrough based on at least one of the source video and one or more secondary source videos and based on a list of player actions corresponding to one or more segments of at least one of the source video and the one or more secondary source videos. The determining may be based on computing the distance between a first embedding of the segment of the source video with a second embedding of the second video across an embedding space. The adjusting of the property may include one or more of rotating the determined portion, translating the determined portion, scaling the determined portion, adjusting the playback speed of the determined portion, adding an element to the determined portion, removing an element from the determined portion, adjusting the transparency of the determined portion. The method may further include identifying one or more suggested player actions of the plurality of player actions. The overlaying of the guide video may further include overlaying the one or more suggested player actions in the currently executing game environment. The detecting of a completed player action may further include detecting that a player performed one or more of the suggested player actions. The completed player action may be based on receiving emulated game controller inputs not originating from a game controller.

According to an embodiment of the disclosed subject matter, a nor-transitory computer-readable medium may include instructions operable, when executed by one or more computing systems to receive a source video and identify a plurality of player actions that occur in gameplay captured in the source video. The medium may further include instructions to receive a second video. The second video may be based on a currently executing game environment. The medium may further include instructions to determine a portion of the source video exhibits a first gameplay situation that may be similar to a gameplay situation in the second video. The medium may further include instructions to adjust a property of the determined portion of the source video to produce a guide video. The medium may further include instructions to overlay the guide video on the currently executing game environment. The medium may further include instructions to detect a completed player action in the currently executing game environment and overlay an updated guide video based on the detecting. The medium may further include instructions to segment the source video portion into a plurality of player actions. The medium may further include instructions to extract a list of player actions from metadata embedded within the source video. The metadata may further include one or more metrics reflecting a skill level of a player. The medium may further include instructions to select the source video based on the one or more metrics. Each identified player action may share a one-to-one correspondence with a game controller input received from a user. The medium may further include instructions to compile a virtual walkthrough based on at least one of the source video and one or more secondary source videos and based on a list of player actions corresponding to one or more segments of at least one of the source video and the one or more secondary source videos. The determining may be based on computing the distance between a first embedding of the segment of the source video with a second embedding of the second video across an embedding space. The adjusting of the property may include one or more of rotating the determined portion, translating the determined portion, scaling the determined portion, adjusting the playback speed of the determined portion, adding an element to the determined portion, removing an element from the determined portion, adjusting the transparency of the determined portion. The medium may further include instructions to identify one or more suggested player actions of the plurality of player actions. The instructions to overlay the guide video may further include instructions to overlay the one or more suggested player actions in the currently executing game environment. The instructions to detect a completed player action may further include instructions to detect that a player performed one or more of the suggested player actions. The completed player action may be based on receiving emulated game controller inputs not originating from a game controller.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3A is a flow diagram according to an embodiment of the disclosed subject matter.

FIG. 4 is a block diagram of a virtual walkthrough according to an embodiment of the disclosed subject matter.

DETAILED DESCRIPTION

As previously discussed, a user that encounters a difficult portion of a video game may seek assistance by searching for a tutorial or gameplay video that may provide an example solution or strategy. Doing so may be a disjointed and clumsy process that may involve exiting from the gaming experience, launching a video service or website, searching for a relevant video, observing the video as many times as desired, exiting from the video service or website, and beginning the game again. Even after performing these steps, the user may forget portions of the previously-observed gameplay technique, which may cause the user to repeat the process.

The present subject matter discloses systems and techniques for providing an in-game guide that may aid a user in progressing through a video game. The guide may be generated based on an analysis of one or more videos that exhibit a player playing the video game. Based on the analysis, the guide may determine a sequence of actions that may succeed in advancing a user through all or a portion of a game. The guide may be provided in a semi-transparent "ghost layer" over the user's in-game display to provide tips and examples of actions based on the analysis that may aid the player in progressing through the game. A ghost layer as disclosed herein may display textual, image, and/or video information, which may be displayed as an overlay of a game such that the game and the ghost layer are concurrently visible to the player. As the user plays the game, the ghost layer may update and adjust what is displayed to provide information relevant to the user based on the current game status, the user's past actions, and any prospective actions in the sequence of actions that may help the user succeed in advancing.

The term "game controller" as used herein refers to any device that may be used by a user to provide input to a game. A game controller may include, for example, a mouse, keyboard, keypad, joystick, stylus, wand, stylus, trackball, trackpad, touchpad, touchscreen, camera, radar transmitter and/or receiver, gamepad, smartphone, and microphone.

Figure 1:
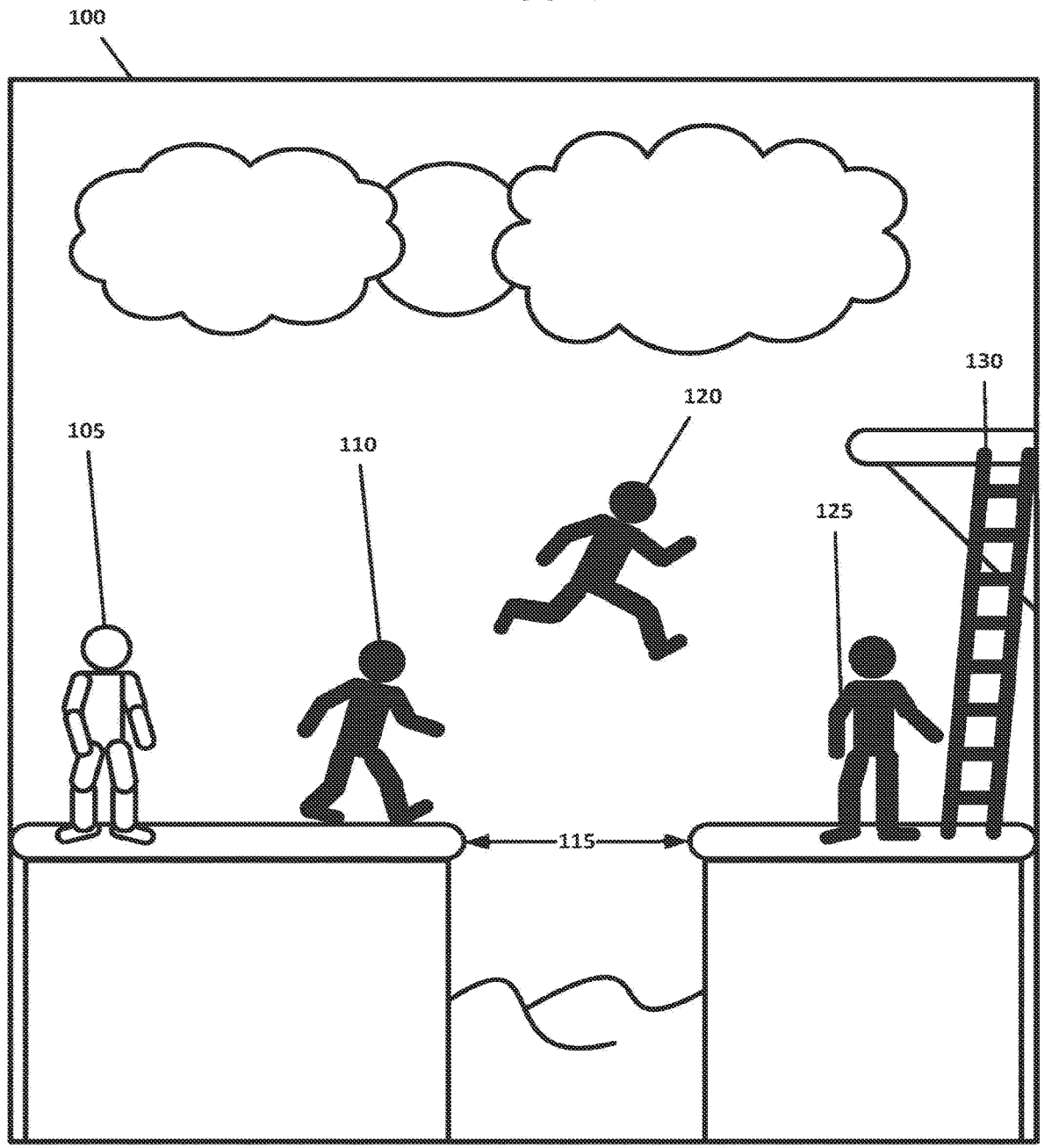
FIG. 1 shows an example embodiment of a ghost layer according to the disclosed subject matter.

FIG. 1 illustrates an example embodiment of the present subject matter. A game screen 100 may be played from the view of a third person. The user may control a single stick-figure-like character 105. To advance through this portion of the game 100, the user may need to control the character 105 to perform three actions. First, the character may walk to the right until reaching the edge of a chasm 115, then the character may jump over the chasm 115, and third, the character may deploy a ladder item 130. Upon receiving a user's request for assistance using a game interface, a ghost layer 200 may display a ghost character 110. The ghost character 110 may walk to the right until reaching the chasm 115, jump 120 over the chasm 115, and deploy the ladder item 130 near the right edge of game screen 100, where the ghost character 110 may wait 125 for the user-controlled player 105 to catch up. The ghost character 110 may be displayed identically as character 105 or may be distinguishable from character 105. For example, ghost character 110 may be displayed in a transparent or semi-transparent manner, in a different color scheme, shade, or tint, in a flashing state, with a halo or highlight, as a silhouette, marked with a label or icon, or having a combination of any one or more of these features, so long as the ghost character 110 may be distinguished from the player character 105.

Alternatively, or in addition to performing two or more tasks collectively and consecutively the ghost character 110 may wait for the user-controlled character 105 to perform an individual task before proceeding to a next task. For example, the ghost character 110 may perform a first task, such as jumping 120 over the chasm 115, and then waiting for the user-controlled character 105 to do the same before proceeding to the next task. Upon character 105 jumping over the chasm 115, the ghost character 110 may perform the second task of walking to the right edge of the game screen 100 and waiting 125 for the player's character 105 to do the same before proceeding to the next task, and so on. Whether the ghost character 110 performs a single task before waiting for the user-controlled character 105 or performs two or more tasks collectively before waiting for the user-controlled character 105, the ghost character 110 may be displayed performing the individual or collective tasks repeatedly for a fixed or infinite number of times. In this way, the user may have an opportunity to see the task performed as many times as desired prior to attempting to do so. It should be appreciated that "ghost" objects may also be provided by the ghost layer 200 where the user-controlled character 105 is being guided to build an object or to use an item. For example, if the user-controlled character 105 is being guided to deploy the ladder item 130 or to push a crate (not shown), a ghost ladder item 130 or a ghost crate may appear to help the user to understand how to proceed. Once user-controlled character 105 deploys the ladder item 130 or otherwise interacts with the suggested object, the ghost object may disappear. Ghost objects may be distinguishable from the "real" game objects in any manner previously described with respect to distinguishing the ghost character 110 from the user-controlled character 105.

Figure 2:
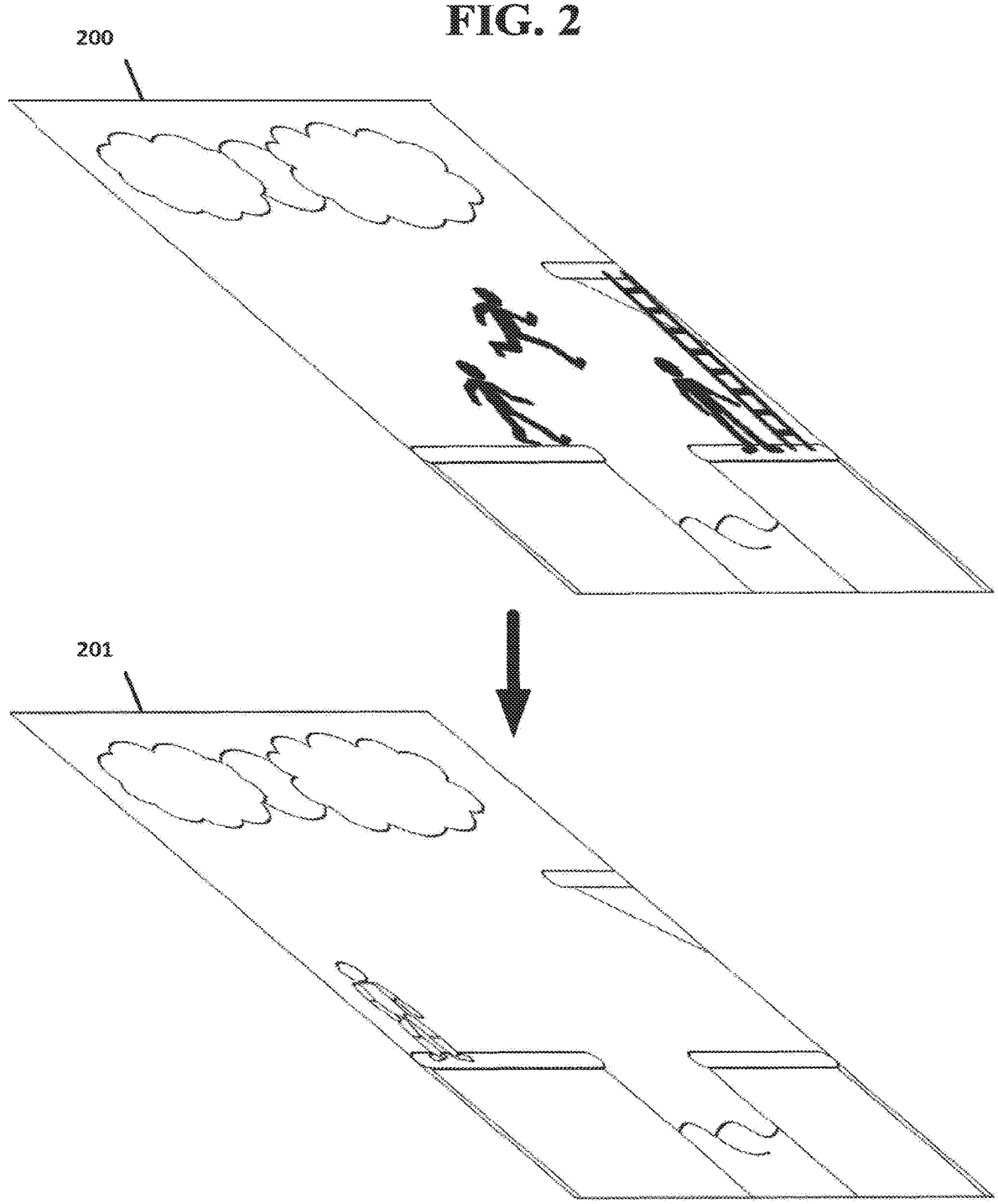
FIG. 2 shows an example embodiment of a ghost layer according to the disclosed subject matter.

FIG. 2 illustrates a ghost layer 200 that may be overlaid on a game environment 201 of an game currently being played by a user. The ghost layer 200, including ghost player 105 and/or ghost objects, such as ladder item 130, may be generated based on an analysis of one or more previously-recorded gameplay videos 305. Gameplay videos 305 may be sourced from, for example, video-sharing websites, live-streamed video, and other video streaming sources, conventional non-transitory computer memory storage devices, or as transmitted across a network via e-mail, instant messaging, SMS, text message, and the like. A game may provide varying degrees of support for performing the analysis used to generate the ghost layer 200. In an example, a game may include little or no support. An analysis of one or more sourced gameplay videos 305 for a non-supportive game may be performed by a computer-implemented process based on one or more of computer vision techniques, machine learning techniques, geometric properties, images, sounds, and the like. The source videos 305 for which the analysis may be based may be identified as tutorials, guides, gameplay sessions, contests, speed runs, and other videos where the actions of the player may be generally more successful in advancing through a game.

Figure 3B:
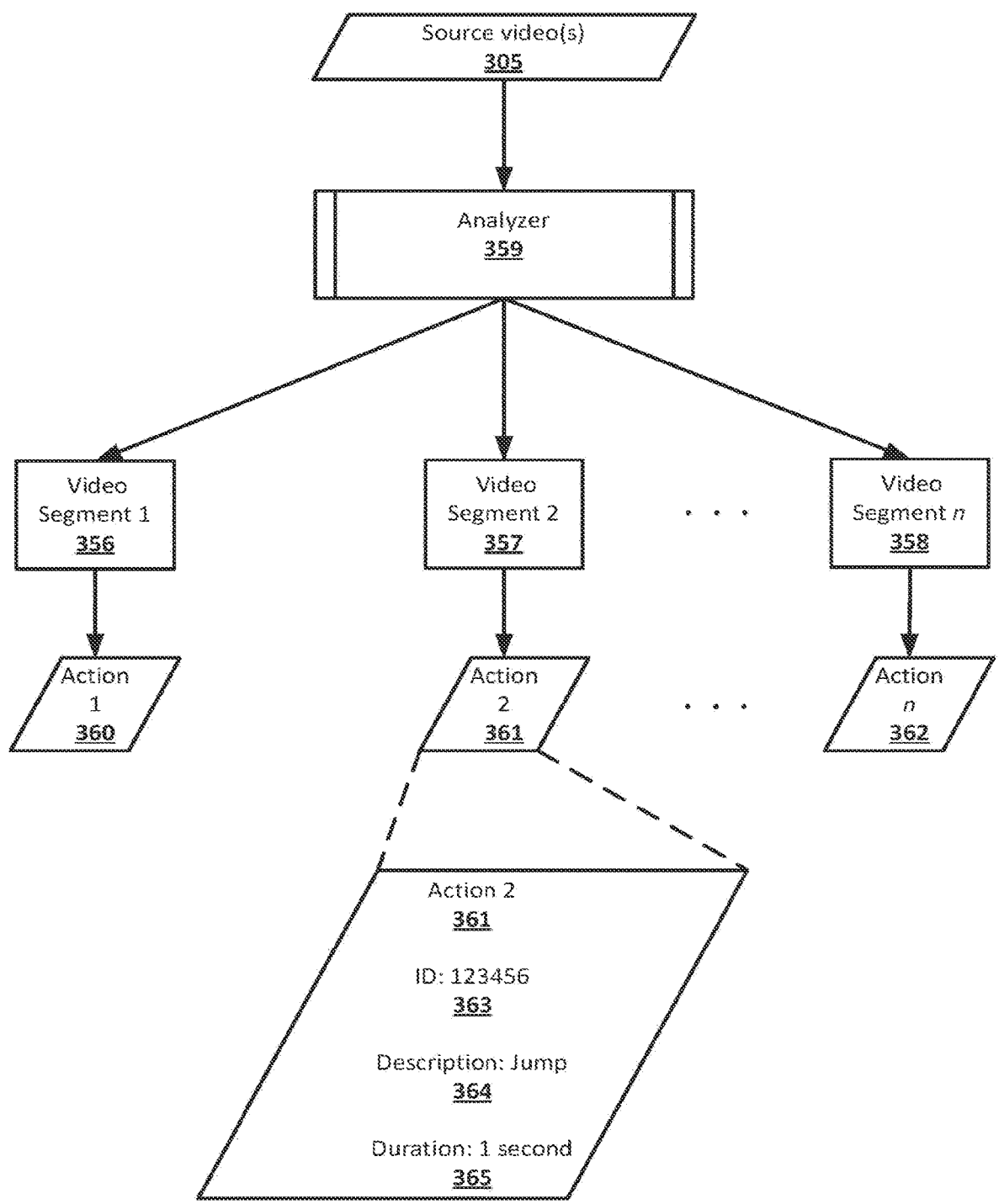
FIG. 3B is a block diagram according to an embodiment of the disclosed subject matter.
Figure 3C:
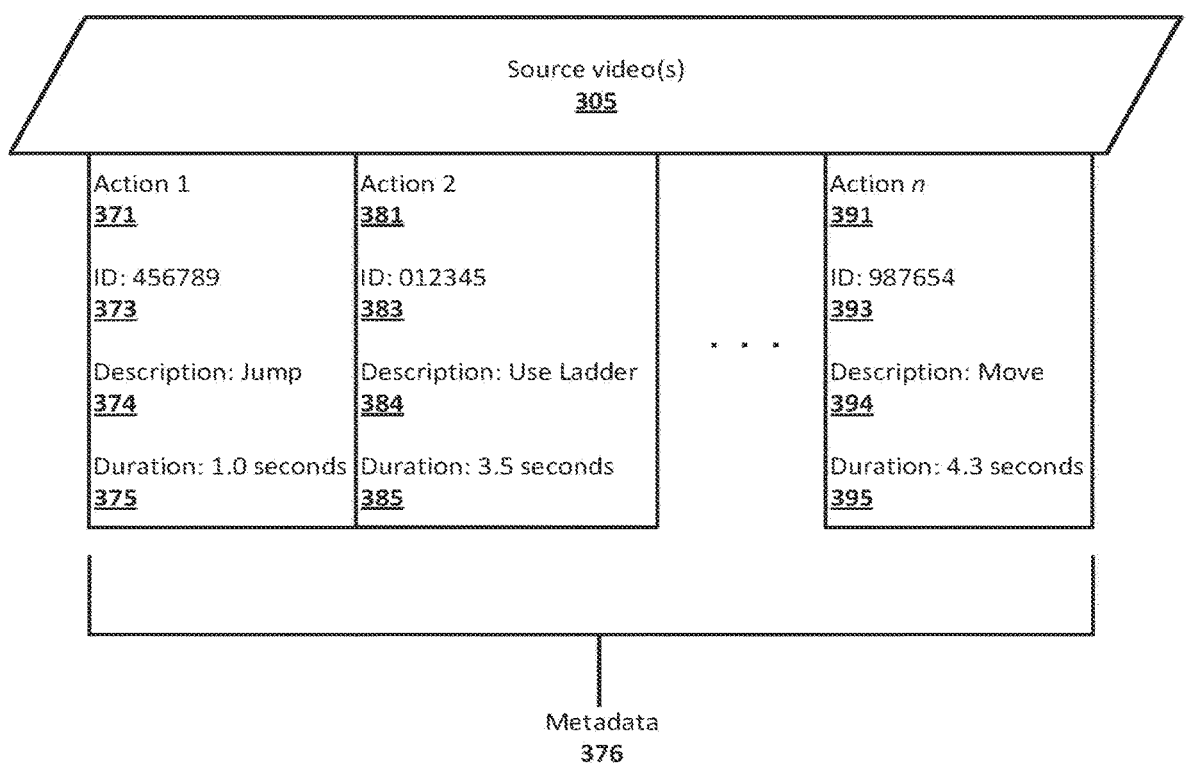
FIG. 3C is a block diagram according to an embodiment of the disclosed subject matter.

FIG. 3A is a flow diagram illustrating an example of a method 300 in accordance with the present subject matter. Method 300 may begin by analyzing one or more source videos 305. The source videos 305 may be tutorials, guides, walkthroughs, or any other videos exhibiting gameplay of a game. The videos may or may not support embedded metadata that may identify each action of the player at each point in the game. Where the source video may not support embedded metadata, an analyzer 350 may segment a source video 305 into individual player actions 360-362 using an analyzer 359, as shown in block diagram 355 of FIG. 3B. Method 300 may segment one or more selected source video(s) 305 into individual player actions at stage 310. Each individual player action 360-362 may correspond to a user input received via a game controller device. Method 300 may identify each player action 360-362 by using a unique identifier 363, a semantic description 364, and a time value 365 reflecting the temporal duration of the associated player action 360-362 in 315. Where a game video 305 supports embedded metadata 376 identifying each action (371, 381, 391) of the player, the analysis may be streamlined or eliminated altogether in that the player actions (371, 381 391) may be extracted directly without the additional processing that may be associated with segmenting the video 305 to extract each player action (371, 381, 391). Based on identifying the actions (371, 381, 391) of the player for a video, a virtual walkthrough 405 may be created in 325 that includes video segments (410, 430, 440, 450, 460) and an associated ordered list of player actions (411-413, 431-433, 451-453, 454-457), as shown in FIG. 4. The virtual walkthrough 405 may identify the game to which it is applicable using a game identifier 470 and may be considered a digital roadmap to successfully progressing through a game from beginning to end. The virtual walkthrough 405 may be incomplete, based on the availability of source videos 305 that succeed in progressing through a game 470, but may nevertheless provide one example approach to completing, a game 470. The virtual walkthrough 405 may comprise video segments (410, 430, 440, 450, 460) extracted from a variety of selected source videos 305, where each video segment (410, 430, 440, 450, 460) may be relied upon for suggesting one or more player actions (411-413, 431-433, 451-453, 454-457). As previously discussed, the game currently being played by the User may be known as the instant game. Method 300 may capture one or more frames from the instant game 330 to compare with the video segments (410, 430, 440, 450, 460) compiled by the virtual walkthrough 405. A match algorithm may determine, based on the capture frames, whether a scenario or moment occurring in the instant game suitable corresponds to a scenario or moment in either a video segment (410, 430, 440, 450, 460) stored in the virtual walkthrough 405 or another separately available video segment in 335. Where the match algorithm determines a suitable match 336, the corresponding video segment (410, 430, 440, 450, 460) may be normalized by translating, rotating, and/or scaling the video, adjusting the image parameters, varying the playback speed, adding highlights, labels, or other indicators and elements, and removing irrelevant content to prepare the video segment for overlaying as the ghost layer 200 in 340. More specifically, the video segments (410, 430, 440, 450, 460) to be normalized may include one or more player actions (411-413, 431-433, 451-453, 454-457) to be suggested to the user based on the currently identified scenario or moment in the instant game. In 345, one or more suggested player actions (411-413, 431-433, 451-453, 454-457) may be displayed in the ghost layer 200 overlaying onto the game environment 201 of the instant game, such that both the current gameplay 201 and the ghost layer overlay 200 are visible to the player. For example, the ghost layer overlay 200 may be semitransparent to allow the underlying gameplay 201 to be concurrently visible. The suggested player actions (411-413, 431-433, 451-453, 454-457) may be repeated a single time, a fixed number of times, or indefinitely until the user performs the action. Method 300 may monitor for and detect completion of a suggested player action (411-413, 431-433, 451-453, 454-457) based on the user's game controller inputs, changes to the user's character, and other changes occurring to the environment 201 of the instant game. As previously discussed, the model 5 may be configured to emulate the user's game controller inputs to produce the suggested player action in addition to merely displaying a suggested player action (411-413, 431-433, 451-453, 454-457) via the ghost layer 200. Therefore, method 300 may detect completion of a suggested player action not only in response to receiving actual game controller inputs from a user, but also in response to receiving emulated game controller inputs from the model. Upon detecting completion of a suggested player action in 350, the ghost layer 200 may be updated to display one or more subsequent actions (411-413, 431-433, 451-453, 454-457), which may be normalized and rendered in the ghost layer 200 as previously described with respect to 345. It should be appreciated that any stage of method 300 may be merged with other stages, performed in an order different from that which is shown in FIG. 3A, repeated, removed altogether, or otherwise rearranged as needed without departing from the scope of the present subject matter.

In analyzing the one or more selected source videos 305 using analyzer 359, the present subject matter may segment, identify, and distinguish the actions taken by a successful player to generate a virtual, action-by-notion walkthrough 405 for a game 470, as shown in FIG. 4. It should be understood from FIG. 4 that each action (411-413, 431-433, 451-453, 454-457) may include the associated identifier (414-416), semantic description (417-419), and duration (420-422), though this additional information is only shown for player actions 411-413. The virtual walkthrough 405 may include screenshots, video segments (410, 430, 440, 450, 460), and an ordered list of each player action (411-413, 431-433, 451-453, 454-457) determined to successively advance a player through a game 470 from beginning to end. Each identified action may share a one-to-one correspondence with a game controller input performed by the user. A game controller input that causes a user-controlled character to perform two or more "chained" actions automatically without entering an additional game controller input to cause the second and subsequent actions may be identified as a single action rather than two or more separate actions. The actions (411-413, 431-433, 451-453, 454-457) may be suggested to the user on a per-game controller-input-basis to avoid confusing the user when suggesting a sequence of actions using the ghost layer 200. For example, in the case where depressing a first button on the game controller causes the user-controlled game character to jump and flip, the analysis may identify the jump and flip in a video as a single jump/flip action rather than a first jump action followed by a second flip action. Actions that involve the player actuating a single game controller input for a period of time, such as to effect movement in a single direction, for example, may be identified as a single action of a longer duration or a series of two or more identical actions having shorter durations.

The virtual walkthrough 405 may include a set of one or more video segments (410, 430, 440, 450, 460) to form a comprehensive master video 480 exhibiting every action (411-413, 431-433, 451-453, 454-457) taken to complete a game in order. The master video 480 may include gameplay video segments (410, 430, 440, 450, 460) performed by different players or the same player and may be retrieved from a variety of video sources. Portions of the master video 480 determined relevant to the scenario that the user is confronting, as subsequently described, may be retrieved from the master video 480 for playback in the ghost layer 200. Each action in the virtual walkthrough may be identified by a unique identifier tag, a semantic description, and a time value reflecting the temporal duration of the associated action. For example, a portion of the virtual walkthrough may be tagged in a manner representative of, "Video Segment 1, Action 1, ID #000001," with a description of "Move Right," along with a time duration of 4.0 seconds." In addition to the foregoing description where a game includes little or no support, a game may also provide stronger support for the ghost layer analysis. For example, a game may support identifying a player's actions from a video by implementing an application programming interface (API) that allows for emitting metadata 376. The metadata 376 may identify each action (371, 381, 391) of the player at each point in the game, among other types of information that may be useful to the analysis. For example, the emitted metadata 376 may also contain information that identifies each time the player lost a life, received damage, or otherwise made a mistake. These metrics may be used to assess whether one gameplay video may exhibit a more successful gameplay approach when compared with another, and therefore may be a more suitable basis for the ghost layer 200 assistance. The gameplay videos 305 sourced and utilized to perform the analysis may be selected based on metadata 376 metrics reflecting the skill level of the player in each video. The API may be configured to allow embedding the metadata 376 within a source video 305, thereby facilitating subsequent analysis of the source video 305 to create the virtual walkthrough 405 of the game. In this way, accurately identifying a player's action based on one or more source videos 305 may be improved and the complexity of and time needed to perform the analysis may be reduced or eliminated altogether.

It should be appreciated that where source videos 305 are unavailable for every point of progression through a game, a complete and comprehensive virtual walkthrough 405 may not be possible to produce without additional efforts. In this situation, the analyzer 359 may attempt to extrapolate from portions of the game, for which source videos 305 exist, that are deemed similar to other portions of the game, for which source videos 305 do not exist, to predict successful actions for the player to take. A source video 305 may be similar to a portion of a game where one or more of the quantity and/or type of enemies are the same, the map or level is the same, one or more obstacles are the same, or a threshold number of other game entities are the same. For example, if source videos 305 exist for level 3 but not for level 1, and level 3 is deemed similar enough to level 1, then analyzer 359 may determine that the source videos 305 for level 3 may be appropriate to inform the suggested actions of a player while playing level 1. A machine learning model 5 may be constructed to provide a ghost layer 200 to a user who is currently playing a game. The model 5 may, based on an input of one or more captured frames of gameplay by the user who is currently playing a game, determine whether a same or similar scenario may be found within the same game based on one or more previously-recorded videos. The videos or video segments that may be used to determine the scenario that the current user may be confronting may or may not be the same as the video segments (410, 430, 440, 450, 460) upon which the virtual walkthrough 405 is based. Said another way, a first video may be used to determine where, in terms of progression, a user is at within a game, while a second video may be used to determine one or more suggested actions (411-413, 431-433, 451-453, 454-457) that a user may take.

Referring back to FIG. 2, the model 5 may overlay a screenshot or segment of video, known as the ghost layer 200, retrieved from the virtual walkthrough 405 on to the game environment 201 to suggest to the user one or more next actions (411-413, 431-433, 451-453, 454-457) that may facilitate advancement in the game 470. In some instances, only a single action may be displayed to the user using the ghost layer 200 until the user performs that action. In other instances, two or more actions may be displayed sequentially. The actions displayed via the ghost layer 200 may occur once, may be repeated a fixed plurality number of times, or may be repeated indefinitely until the user performs the actions. The model 5 may detect that the user has performed the suggested actions displayed in the guide based on one or more of the user's game controller inputs, changes to the user's character, and other changes occurring to the game environment 201.

The model 5 may provide a variety of enhancements and transformations to the screenshot or video segment (410, 430, 440, 450, 460) provided from the virtual walkthrough 405. These processes may be referred to as "normalizing" 340 the previously-recorded video segments. The goal of normalizing 340 may be to process the video segments (410, 430, 440, 450, 460) so that they may be layered over the existing game environment 201 in a manner that aesthetically matches the point of view, scale, and motion, without obstructing the user's view. For example, the model 5 may translate, rotate, scale the screenshot or video segment to more closely match the perspective of the user in the current game environment 201. The model 5 may add labels, highlights, and other indicators and elements to the screenshot or video segment. The model 5 may add or remove sounds present in the video segment from the virtual walkthrough 405. The model 5 may remove portions of the screenshot or video segment, such as portions that may be irrelevant to the current player or the current game environment 201 scenario. For example, the model 5 may detect and identify entities shown in a previously-recorded gameplay video based on whether they entities are moving or non-moving. A non-moving entity may be determined to be a dead or otherwise inactive enemy, for example, and may not displayed to the user in the ghost layer 200 of the game currently being played. The model 5 may adjust the gamma/brightness, contrast, tint, and transparency of the screenshot or video segment. The model 5 may vary the playback speed of the video. For example, the model 5 may be configured to playback the ghost layer 200 video at a reduced speed to ease the user's ability to more easily recognize the action(s) being performed.

The model 5 may be implemented using a machine learning model. As previously discussed, the model 5 may, based on an input of one or more frames of gameplay 330 by a user who is currently playing a game, determine a same or similar scenario 335 for which one or more previously-recorded game videos exist. The one or more frames of the game currently being played 330 may form a video and as used herein, will be referred to as the instant game video. The previously-recorded game videos may be compiled into a comprehensive master video 480 to simplify retrieval from a single source, as previously discussed, or may remain separate. The model 5 may match 335 the instant game video 330 with a segment of previously-recorded game video 305, either from the master video 480 or a separately sourced video. A match 336 may be determined based on a prediction score that reflects the model's certainty about whether the situation shown in the previously-recorded game video is the same or a similar situation in the instant game video. The matching algorithm implemented by the model 5 may be based on a scale-invariant feature transform (SIFT) algorithm that may identify and match key points between the previously-recorded game video 305 and the instant game video 330. The matching algorithm may also be based on deep-learning where a neural network may be trained to learn an embedding space for the previously-recorded game video and the instant game video, and the matching may be performed based on the distance between the embeddings of the previously-recorded game video and the instant game video. Where the matching algorithm determines, based on meeting a threshold prediction score or meeting a threshold distance between the embeddings, that a previously-recorded video segment suitably matches with the instant game video 330, the model 5 may determine that providing the previously-recorded video segment in the ghost layer 200 may be helpful to the user and provide it where enabled by the user to do so.

The ghost layer 200 may be invoked to provide a variable degree of guidance to the user. As previously discussed, the ghost layer 200 may be displayed to the user in the form of a video that may be transformed, adjusted, and presented to the user within the instant game environment 201. Therefore, the user may learn by observing each action shown in the ghost layer 200 video. Where desired, the model 5 may also take the control from the user by emulating the corresponding game controller inputs to perform the actions suggested in the previously-recorded game video(s) and/or the virtual walkthrough 405. This feature may be implemented using reinforcement learning algorithms, for example. In an embodiment, an action space may be defined that includes all possible inputs that may be received from a game controller. A reinforcement learning algorithm may train using sourced gameplay videos 305 to attempt to mimic the gameplay shown in the source videos 305. In an example, each time an action is taken, a vector including the current frame, action, and next frame may generated. The next frame may be based on the gameplay image shown after emulating a game controller input to perform the action. A pixel-distance loss calculation may be used to identify differences between the next frame obtained after taking the action and the next frame following the action in a source video 305. The user may be offered the option to configure the degree of guidance from the ghost layer 200. For example, the user may prefer the model 5 take control of game controller inputs during more difficult portions of the instant game and to allow the user to merely observe the ghost layer 200 video and provide his or her own game controller inputs during easier portions. Model 5 may also vary the degree to which it takes control. For example, where a user may have difficulty due to a disability or injury, the model 5 may reduce the complexity and/or the number of controller inputs needed in order to advance the player through a portion of the game by supplementing. Model 5 may achieve this by supplementing the user's game controller inputs with additional game controller inputs, thereby reducing the total number of game controller inputs to be provided by the user and/or the number of simultaneous game controller inputs. During other portions of the game, the user may prefer to not display the ghost layer 200 at all and disable it during those times.

In an embodiment, the ghost layer 200 provided to the user in the instant game may be based on the performance of a player who is currently live-streaming the same game, rather than based on the performance of a player in one or more pre-recorded source videos 305. That is, the actions of the live streaming, player may be provided in the ghost layer 200 that may be transformed as previously-discussed and that may overlay the user's game environment 201 of the instant game. In this way, the live-streaming, player may provide "coaching" in real-time to the ghost layer-assisted user.

In an embodiment, a process may be employed to determine whether a match exists between a sourced gameplay video 305 and one or more frames of a game currently being played by a user. Based on a sourced gameplay video 305, a three-dimensional or two-dimensional game environment including one or more entities may be reconstructed. An entity may be, for example, an enemy, an enemy pattern, an object, a doorway, a building, a level, a map, a track, an obstacle, or other feature that defines the gameplay viewed by the user. Each entity within game environment 201 may be extracted and coarsely defined using a set of coordinates and/or polygon shapes that may be stored in metadata. The metadata may include additional information for each game entity, such as texture or image information, entity type, description, and the like. A gaming platform associated with the game currently being played by the user may describe and/or define the entities present at each game state. In this context, a game state may refer to a set of one or more frames occurring between actions taken by the user. A current game state including one or more defined entities presented to the user may be compared with the reconstructed game environment to determine if a match is likely. A match may indicate, for example, that the scenario presented to the player in the source video 305 is the same or similar as the game environment 201 presented to the user in the game currently being played. A match 336 may be determined using an extraction algorithm to extract and compare the entities shown in the constructed came environment with the entities shown in the game environment 201 currently displayed to the user during gameplay. In an example, the matching between the game environment 201 and the constructed game environment may be carried out based on an entity-by-entity comparison or similar. A greater number of same game entities between the game environment 201 and the constructed game environment may indicate a greater similarity, while a fewer number of same game entities may indicate less similarity. A threshold may be configured to establish a minimum quantity of game entities that may be deemed the same for a match 336 to be positively identified. Weights may be assigned to each game entity based on its type and incorporated into the matching algorithm. For example, in a racing game, a same racetrack between a source video 305 and the track on which the player is racing in the game currently being played may be weighted to provide a greater indicator of similarity than the number or type of other cars in which the player is racing against. The ghost layer 200 interface may overlay one or more frames from the source video 305, in addition to labels, annotations, or other elements, to the user's current game environment 201 based both on the matching and/or based on the entities extracted from the source video 305, as previously described.

Figure 5:
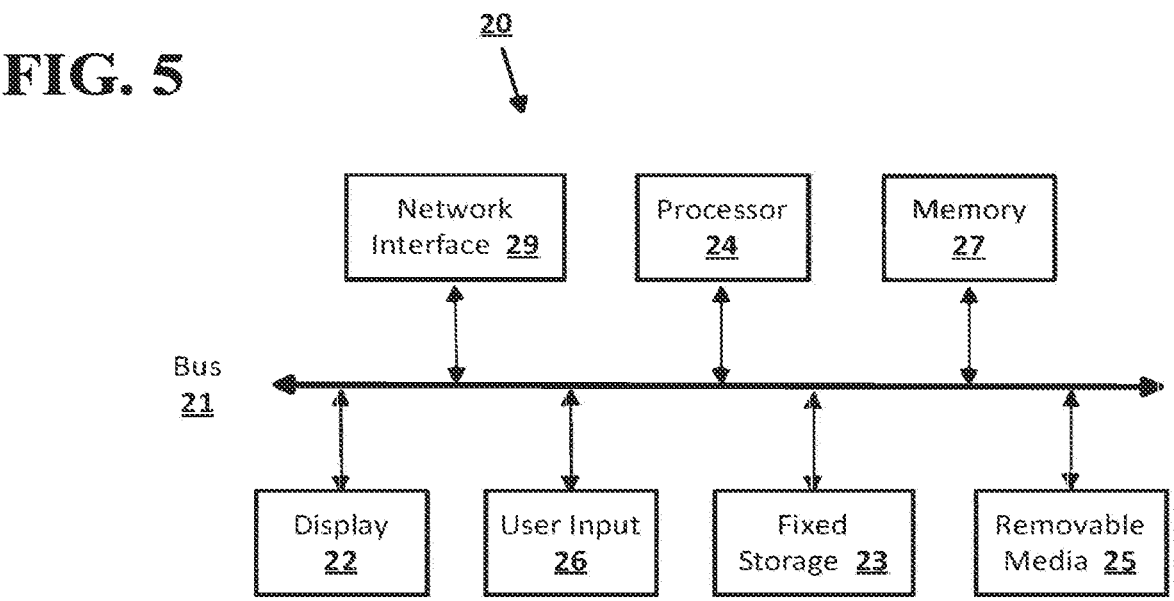
FIG. 5 shows a computing device according to an embodiment of the disclosed subject matter.

Embodiments of the presently disclosed subject matter may be implemented in and used with a variety of component and network architectures. FIG. 5 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy, disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
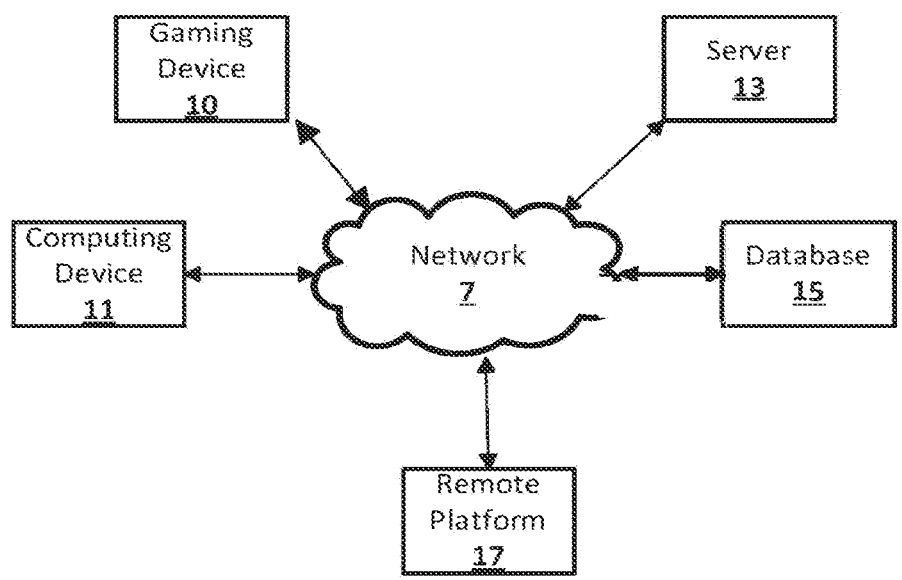
FIG. 6 shows a network configuration according to an embodiment of the disclosed subject matter.

FIG. 6 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 7:
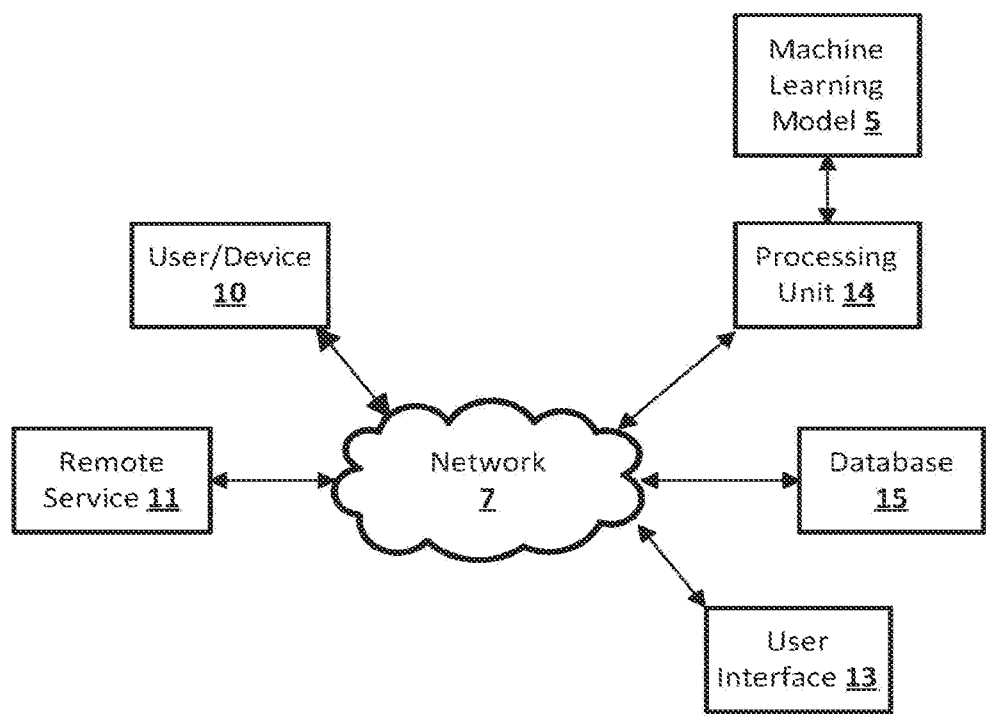
FIG. 7 shows an example network and system configuration according to an embodiment of the disclosed subject matter.

FIG. 7 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, a, a machine learning model 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such is over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The present subject matter may improve a user's enjoyment of a game by reducing the friction associated with finding and obtaining gameplay assistance. The embodiments disclosed herein may allow a user to receive in-game assistance while playing a game without exiting the game. The embodiments disclosed herein may relieve the user from searching for relevant gameplay videos on video sharing websites to observe a successful player advance through a portion of a game with which the user is having trouble. The embodiments disclosed herein may leverage the massive, pre-existing library of gameplay videos available to provide in-game assistance to a user in a manner that is convenient and saves time when compared with the conventional methods of finding assistance. The embodiments disclosed herein may assume varying degrees of control over the user's game controller inputs to reduce the difficulty of a game.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

implementations disclosed herein can include systems, devices, arrangements, techniques, and compositions such as the following:

1. A computer-implemented method comprising:
    receiving a source video;
    identifying a plurality of player actions that occur in gameplay captured in the source video;
    receiving a second video, the second video based on a currently executing game environment;
    determining a portion of the source video exhibits a first gameplay situation that is similar to a gameplay situation in the second video;
    adjusting a property of the determined portion c the source video to produce a guide video; and
    overlaying the guide video on the currently executing game environment.
2. The method of implementation 1, further comprising segmenting the source video portion into a plurality of player actions.
3. The method of implementation 1 or 2, further comprising extracting a list of player actions from metadata embedded within the source video.
4. The method of implementation 3, wherein the metadata further includes one or more metrics reflecting a skill level of a player and wherein the method further comprises selecting the source video based on the one or more metrics.
5. The method of any one of the preceding implementations, further comprising:
    detecting a completed player action in the currently executing game environment; and
    overlaying an updated guide video responsive to the detected completed player action.
6. The method of any one of the preceding implementations, wherein each identified player action shares a one-to-one correspondence with a game controller input received from a user.
7. The method of any one of the preceding implementations, further comprising compiling a virtual walkthrough based on:
    at least one of the source video and one or more secondary source videos; and
    a list of player actions corresponding to one or more segments of at least one of the source video and the one or more secondary source videos.
8. The method of any one of the preceding implementations, wherein the determining is based on computing the distance between a first embedding of the segment of the source video with a second embedding of the second video across an embedding space.
9. The method of any one of the preceding implementations, wherein adjusting the property includes one or more selected from the group consisting of:
    rotating the determined portion;
    translating the determined portion;

scaling the determined portion;
adjusting the playback speed of the determined portion;
adding an element to the determined portion;
removing an element from the determined portion; and
adjusting the transparency of the determined portion.
10. The method of any one of the preceding implementations, further comprising:
identifying one or more suggested player actions of the plurality of player actions, wherein
the overlaying the guide video further comprises overlaying the one or more suggested player actions in the currently executing game environment; and
the detecting a completed player action further comprises detecting that a player performed one or more of the suggested player actions.
11. The method of any one of the preceding implementations, wherein the completed player action is based on receiving emulated game controller inputs not originating from a game controller.
12. The method of any one of the preceding implementations, wherein the determining the portion of the source video exhibits the first gameplay situation comprises selecting the source video from among a plurality of gameplay videos.
13. The method of any one of the preceding implementations, wherein the receiving the source video and the identifying the plurality of player actions are performed subsequent to the receiving the second video.
14. The method of any one of the preceding implementations, further comprising receiving a request from a user of the currently executing game environment to generate the guide video,
wherein the overlaying the guide video is performed in response the request.
15. A non-transitory computer-readable medium comprising instructions operable, when executed by one or more computing systems, to:
receive a source video;
identify a plurality of player actions that occur in gameplay captured in the source video;
receive a second video, the second video based on a currently executing game environment;
determine a portion of the source video exhibits a gameplay situation that is similar to a gameplay situation in the second video;
adjust a property of the determined portion of the source video to produce a guide video; and
overlay the guide video on the currently executing game environment.
16. The medium of implementation 15, further comprising instructions operable to segment the source video portion into a plurality of player actions.
17. The medium of implementation 15 or 16, further comprising instructions operable to extract a list of player actions from metadata embedded within the source video.
18. The medium of implementation wherein the metadata further includes one or more metrics reflecting a skill level of a player, and
wherein the medium further comprises instructions operable to select the source video based on the one or more metrics.
19. The medium of any one of the preceding implementations, further comprising instructions operable to:
detect a completed player action in the currently executing game environment; and
overlay an updated guide video responsive to the detected completed player action.
20. The medium of any one of the preceding implementations, wherein each identified player action shares a one-to-one correspondence with a game controller input received from a user.
21. The medium of any one of the preceding implementations, further comprising instructions operable to compile a virtual walkthrough based on:
at least one of the source video and one or more secondary source videos; and
a list of player actions corresponding to one or more segments of at least one of the source video and the one or more secondary source videos.
22. The medium of any one of the preceding implementations, wherein the determining is based on computing the distance between a first embedding of the segment of the source video with a second embedding of the second video across an embedding space.
23. The medium of any one of the preceding implementations, wherein the instructions operable to adjust the property further comprises instructions operable to perform one or more selected from the group consisting of:
rotate the determined portion;
translate the determined portion;
scale the determined portion;
adjust the playback speed of the determined portion;
add an element to the determined portion;
remove an element from the determined portion; and
adjust the transparency of the determined portion.
24. The medium of any one of the preceding implementations, further comprising instructions operable to:
identify one or more suggested player actions of the plurality of player actions, wherein:
the instructions operable to overlay the guide video further comprises instructions operable to overlay the one or more suggested player actions in the currently executing game environment; and
the instructions operable to detect a completed player action further comprises instructions operable to detect that a player performed one or more of the suggested player actions.
25. The medium of any one of the preceding implementations, wherein the completed player action is based on instructions operable to receive emulated game controller inputs not originating from a game controller.
26. The medium of any one of the preceding implementations, wherein the instructions operable to determine the portion of the source video exhibits the first gameplay situation further comprises instructions operable to select the source video from among a plurality of gameplay videos.
27. The medium of any one of the preceding implementations, wherein the instructions operable to receive the source video and the identify the plurality of player actions are performed subsequent to the instructions operable to receive the second video.
28. The medium of claim 15, further comprising instructions operable to receive a request from a user of the currently executing game environment to generate the guide video,
wherein the instructions operable to overlay the guide video are performed in response the request.

The invention claimed is:

1. A computer-implemented method comprising:
   receiving a source video;
   identifying a plurality of player actions that occur in gameplay captured in the source video;
   receiving a second video, the second video based on a currently executing game environment;
   determining a portion of the source video exhibits a first gameplay situation that is similar to a second gameplay situation in the second video based on a comparison of a captured frame of the second video to the portion of the source video;
   adjusting a property of the determined portion of the source video to produce a semi-transparent guide video; and
   overlaying the semi-transparent guide video on at least a portion of the currently executing game environment such that the at least a portion of the currently executing game environment and the guide video are concurrently visible.

2. The method of claim 1, further comprising segmenting the source video into the plurality of player actions.

3. The method of claim 1, further comprising extracting a list of player actions from metadata embedded within the source video.

4. The method of claim 3, wherein the metadata further includes one or more metrics reflecting a skill level of a player and wherein the computer-implemented method further comprises selecting the source video based on the one or more metrics.

5. The method of claim 1, further comprising:
   detecting a completed player action in the currently executing game environment; and
   overlaying an updated guide video responsive to the detected completed player action.

6. The method of claim 5, further comprising:
   identifying one or more suggested player actions of the plurality of player actions, wherein:
      the overlaying the guide video further comprises overlaying the one or more suggested player actions in the currently executing game environment; and
      the detecting a completed player action further comprises detecting that a player performed one or more of the suggested player actions.

7. The method of claim 6, wherein the completed player action is based on receiving emulated game controller inputs not originating from a game controller.

8. The method of claim 1, wherein each identified player action shares a one-to-one correspondence with a game controller input received from a user.

9. The method of claim 1, further comprising compiling a virtual walkthrough based on:
   at least one of the source video and one or more secondary source videos; and
   a list of player actions corresponding to one or more segments of at least one of the source video and the one or more secondary source videos.

10. The method of claim 1, wherein the determining the portion of the source video exhibits the first gameplay situation that is similar to the second gameplay situation in the second video is further based on a distance between a first embedding of the portion of the source video and a second embedding of the captured frame of the second video across an embedding space.

11. The method of claim 1, wherein adjusting the property includes one or more selected from the group consisting of:
   rotating the determined portion;
   translating the determined portion;
   scaling the determined portion;
   adjusting a playback speed of the determined portion;
   adding an element to the determined portion;
   removing an element from the determined portion; and
   adjusting a transparency of the determined portion.

12. The method of claim 1, wherein the determining the portion of the source video exhibits the first gameplay situation comprises selecting the source video from among a plurality of gameplay videos.

13. The method of claim 1, wherein the receiving the source video and the identifying the plurality of player actions are performed subsequent to the receiving the second video.

14. The method of claim 1, further comprising receiving a request from a user of the currently executing game environment to generate the guide video, wherein the overlaying the guide video is performed in response the request.

15. A non-transitory computer-readable medium comprising instructions operable, when executed by one or more computing systems, to:
   receive a source video;
   identify a plurality of player actions that occur in gameplay captured in the source video;
   receive a second video, the second video based on a currently executing game environment;
   determine a portion of the source video exhibits a first gameplay situation that is similar to a second gameplay situation in the second video based on a comparison of a captured frame of the second video to the portion of source video;
   adjust a property of the determined portion of the source video to produce a semi-transparent guide video; and
   overlay the semi-transparent guide video on at least a portion of the currently executing game environment such that the semi-transparent guide video and the at least a portion of the currently executing game environment are concurrently visible.

16. The medium of claim 15, further comprising instructions operable to segment the source video into the plurality of player actions.

17. The medium of claim 15, further comprising instructions operable to extract a list of player actions from metadata embedded within the source video.

18. The medium of claim 17, wherein the metadata further includes one or more metrics reflecting a skill level of a player, and wherein the medium further comprises instructions operable to select the source video based on the one or more metrics.

19. The medium of claim 15, further comprising instructions operable to:
   detect a completed player action in the currently executing game environment; and
   overlay an updated guide video responsive to the detected completed player action.

20. The medium of claim 19, further comprising instructions operable to:
   identify one or more suggested player actions of the plurality of player actions, wherein:
      the instructions operable to overlay the guide video further comprise instructions operable to overlay the one or more suggested player actions in the currently executing game environment; and the instructions operable to detect a completed player action further comprises instructions operable to detect that a player performed one or more of the suggested player actions.

21. The medium of claim 20, wherein the completed player action is based on instructions operable to receive emulated game controller inputs not originating from a game controller.

22. The medium of claim 15, wherein each identified player action shares a one-to-one correspondence with a game controller input received from a user.

23. The medium of claim 15, further comprising instructions operable to compile a virtual walkthrough based on:
    at least one of the source video and one or more secondary source videos; and
    a list of player actions corresponding to one or more segments of at least one of the source video and the one or more secondary source videos.

24. The medium of claim 15, wherein the determining the portion of the source video exhibits the first gameplay situation that is similar to the second gameplay situation in the second video is further based on computing a distance between a first embedding of the portion of the source video and a second embedding of the captured frame of the second video across an embedding space.

25. The medium of claim 15, wherein the instructions operable to adjust the property further comprises instructions operable to perform one or more selected from the group consisting of:
    rotate the determined portion;
    translate the determined portion;
    scale the determined portion;
    adjust a playback speed of the determined portion;
    add an element to the determined portion;
    remove an element from the determined portion; and
    adjust a transparency of the determined portion.

26. The medium of claim 15, wherein the instructions operable to determine the portion of the source video exhibits the first gameplay situation further comprises instructions operable to select the source video from among a plurality of gameplay videos.

27. The medium of claim 15, wherein the instructions operable to receive the source video and to identify the plurality of player actions are performed subsequent to the instructions operable to receive the second video.

28. The medium of claim 15, further comprising instructions operable to receive a request from a user of the currently executing game environment to generate the guide video, wherein the instructions operable to overlay the guide video are performed in response the request.

* * * * *